(12) United States Patent
Holton

(10) Patent No.: US 8,700,721 B2
(45) Date of Patent: Apr. 15, 2014

(54) METHOD AND SYSTEM FOR ELECTRONIC DELIVERY OF ESSENTIAL MAIL ITEMS

(75) Inventor: David John Holton, Victoria (AU)

(73) Assignee: David John Holton, Victoria (AU)

( * ) Notice: Subject to any disclaimer, the term of this patent is extended or adjusted under 35 U.S.C. 154(b) by 0 days.

(21) Appl. No.: 13/400,413

(22) Filed: Feb. 20, 2012

(65) Prior Publication Data

US 2012/0216261 A1  Aug. 23, 2012

Related U.S. Application Data

(63) Continuation of application No. 12/161,462, filed as application No. PCT/AU2007/000054 on Jan. 19, 2007, now abandoned.

(30) Foreign Application Priority Data

Jan. 19, 2006 (AU) .................................. 200600287
Mar. 21, 2006 (AU) ................................ 2006901450

(51) Int. Cl.
*G06F 15/16* (2006.01)

(52) U.S. Cl.
USPC ........... 709/206; 709/203; 709/217; 709/218; 709/219; 709/227; 709/229; 709/250

(58) Field of Classification Search
None
See application file for complete search history.

(56) References Cited

U.S. PATENT DOCUMENTS

| | | | |
|---|---|---|---|
| 5,832,460 A * | 11/1998 | Bednar et al. ................ | 705/27.2 |
| 5,956,391 A | 9/1999 | Melen et al. | |
| 5,963,925 A | 10/1999 | Kolling et al. | |
| 6,018,724 A | 1/2000 | Arent | |
| 6,049,786 A | 4/2000 | Smorodinsky | |
| 6,158,007 A | 12/2000 | Moreh et al. | |
| 6,285,991 B1 | 9/2001 | Powar | |
| 6,292,789 B1 | 9/2001 | Schutzer | |
| 7,702,579 B2 * | 4/2010 | Neely et al. ..................... | 705/40 |

(Continued)

FOREIGN PATENT DOCUMENTS

CA    2300023 A1    8/2001

OTHER PUBLICATIONS

Australian Patent Office decision of Sep. 30, 2010 regarding Innovation Patent No. 2007100419 for a Method and System for Electronic Delivery of Essential Mail Items.

(Continued)

*Primary Examiner* — Thu Nguyen
*Assistant Examiner* — Angela Widhalm
(74) *Attorney, Agent, or Firm* — Thomas W. Tolpin; Tolpin & Partners, PC

(57) ABSTRACT

A delivery server, and a method of operating same for providing an trusted electronic mail service for the delivery of items to a subscriber. An associated database contains subscriber details. The server receives from the subscriber a nomination of at least one service provider from which the subscriber wishes to receive electronic mail items. The nomination is stored in the database in association with the subscriber details. A trusted communications channel is established between the delivery server and a service provider computer system, for example via the Internet or other public network. The delivery server receives essential mail data from the service provider via the communications channel, and verifies that the subscriber wishes to receive a corresponding electronic mail item, by comparison with subscriber details and nominations stored in the database. In the event that the verification is successful, the delivery server delivers the electronic mail item to the subscriber.

20 Claims, 9 Drawing Sheets

(56) References Cited

U.S. PATENT DOCUMENTS

| | | | |
|---|---|---|---|
| 2002/0023055 A1 | 2/2002 | Antognini et al. | |
| 2002/0033416 A1* | 3/2002 | Gerszberg et al. | 235/380 |
| 2002/0065896 A1 | 5/2002 | Burakoff et al. | |
| 2004/0024702 A1 | 2/2004 | Angel et al. | |
| 2004/0064387 A1 | 4/2004 | Clarke et al. | |
| 2005/0165680 A1* | 7/2005 | Keeling et al. | 705/40 |
| 2005/0177507 A1 | 8/2005 | Bandych et al. | |
| 2005/0209990 A1 | 9/2005 | Ordille et al. | |
| 2005/0216421 A1 | 9/2005 | Barry et al. | |
| 2006/0080263 A1* | 4/2006 | Willis et al. | 705/76 |
| 2006/0277258 A1* | 12/2006 | Goldfarb | 709/206 |
| 2008/0120212 A1 | 5/2008 | Aber et al. | |

OTHER PUBLICATIONS

International Application No. PCT/AU2007/000054, filed Jan. 19, 2007, International Publication No. WO 07/079550 A1 with International Search Report, published Jul. 19, 2007, of inventor David John Holton, for a Method and System for Electronic Delivery of Essential Mail Items.

International Preliminary Report on Patentability, International Application No. PCT/AU2007/000054, filed Jan. 19, 2007, of inventor David John Holton, for a Method and System for Electronic Delivery of Essential Mail Items.

International Publication No. WO 2004/053752 A1 with International Search Report, published Jun. 24, 2004, of inventor Todd, for Methods, Apparatus and Computer Programs for Processing Alerts and Auditing in a Publish/ Subscribe System.

Supplement European Search Report of Dec. 12, 2011 regarding European Patent Application No. EP 07701391 of of inventor David John Holton, for a Method and System for Electronic Delivery of Essential Mail Items.

* cited by examiner

METHOD AND SYSTEM FOR ELECTRONIC DELIVERY OF ESSENTIAL MAIL ITEMS

FIELD OF THE INVENTION

The present invention relates to a method and system for electronically delivering financial statements, invoices and other essential mail items. In this context, a mail item may be considered "essential" if it is of particular interest, value or importance to the recipient, and in particular essential mail items include those types of solicited mail, such as utility bills, telephone bills, bank statements, government documents and other items prepared by trusted service providers that have traditionally been sent via the conventional postal system.

BACKGROUND OF THE INVENTION

In Australia alone, approximately 50 million financial statements, invoices and/or bills are sent each week to the Australian public, the majority via the conventional postal system. The estimated delivery time of each such mail item, from data extraction from a service provider's database to the physical mail box of the customer, is approximately 3 to 7 days.

There are a number of problems with the conventional mailing of invoices and statements. These problems include the delays mentioned above, as well as financial cost, the environmental impact of producing a paper document and mailing it to a customer, delays in the cash flow of the service provider, and locating customers whose address may have changed. The cost of generating and mailing items such as invoices, bills and financial statements may be substantial, being at least A$1.00 to A$3.00, with more recent estimates as high as A$5.00 to A$9.00, once all costs associated with the production and mailing of the documents have been taken into account.

At present, approximately 95 percent of all financial statements, invoices and bills are handled through the conventional mail delivery system described above. Despite the increasing availability of electronic systems, which make statements, invoices and similar items available online for collection by the customer, or via electronic mail delivery to a customer's email address, the uptake of such electronic services has been relatively low, e.g. around 5 percent. This tow uptake may initially appear surprising, since quite aside from the financial savings available to service providers, there are clearly also significant potential benefits to consumers in opting for electronic delivery. For example, many consumers are increasingly concerned about the environmental and social impact of increasing resource consumption, and especially the use of paper, due to the effects of logging not only upon forests themselves, but also the follow-on effects upon the atmosphere, water quality, and the impact upon dependent varieties of flora and fauna. There is an impact also upon the consumer in receiving and processing paper documents. Depending upon their content, such documents must either be stored or disposed of. In this regard, consumers are also increasingly concerned about privacy issues, including identity theft and fraud, which are exacerbated when paper documents may fall into the hands of unscrupulous parties. For example, important documentation containing personal information, including invoices, bills and financial statements, may be stolen from letter boxes, recycling bins, or rubbish bins. Yet, notwithstanding these and other issues, to date consumers have shown a continuing clear preference for receiving essential mail items via the conventional postal system.

The real and perceived problems with electronic delivery of essential mail items are many and varied. Possibly the most significant, however, are issues relating to security and trust. The conventional mail system provides users with a single point of delivery (e.g. a letter box or post office box), along with the confidence that is provided due to the system being exclusively or primarily operated by a long-term, trusted operator, such as a national mail service provider (e.g. Australia Post in Australia, the US Postal Service in the United States of America, the Royal Mail in the United Kingdom, and so forth). Consumers do not generally feel the same levels of trust and confidence in electronic systems, and are greatly concerned about issues of security and convenience associated with the online delivery of essential mail items.

Such consumer concerns are not entirely unfounded, and many arise as a result of genuine technical limitations of existing online delivery systems. While email is now widely used as a means of personal and business communications, having the advantages of rapid delivery and low cost as compared with alternatives such as conventional mail and facsimile, it is also now widely realised that email is not a direct replacement for the conventional mail system, and that it has a number of significant shortcomings.

For example, the very openness of the email system which enables easy and rapid access and communications between persons all around the globe, is also its greatest weakness. Unsolicited commercial email, colloquially known as "spam", is now rife on the Internet, and constitutes a sizeable proportion of all email sent and received on any given day. In many cases, the senders of such spam email seek to conceal their identity, and may even fraudulently alter email headers to make it appear as if the spam email has been sent from a trustworthy source. As a result, illegal activities such as Internet banking fraud and other scams are not uncommon. Legitimate mail items may be lost or overlooked by users amongst numerous unsolicited items. In order to minimise the impact of unsolicited email, so-called "spam blocking" filters have been developed, however these are imperfect and therefore tend to allow the delivery of some items that should have been blocked, and similarly may block items, including essential items, that the user would wish to have delivered. The imperfection of spam blocking filters is an unavoidable technical problem, arising from the open nature of the Internet generally, and the email system in particular, and from the impossibility of designing heuristic filtering algorithms that are capable of infallibly distinguishing desirable items from spam and other unsolicited content.

A further consequence of the prevalence of unsolicited email is that it is increasingly common for users to regularly change their email addresses, once the levels of spam received by an existing email address become excessive. This practice further mitigates against the delivery of essential mail items via email, since it is necessary for a consumer, upon changing email address, to notify all relevant service providers of the new electronic delivery details.

Alternative approaches for electronic delivery of essential mail items such as financial statements, invoices and bills include the provision of a web-based interface, via which the user may retrieve one or more nominated essential items. Such web sites are generally operated by or on behalf of particular service providers. For example, an individual telephone or utility company may provide a service whereby users are able to log in and review outstanding charges, and possibly also complete payment, for example by providing credit card details. Individual banks also operate their own Internet banking services, most of which enable users to log in and obtain current financial information, including balance summaries and statements of recent transactions. A significant disadvantage of these types of systems is the resulting number of user names, passwords and other security information that may be required by consumers in order to access the sites of the different service providers. This is not only an inconvenience, but also a potential security risk, since consumers having an increasing number of passwords may write them down, creating the possibility that they may be stolen or copied, or alternatively elect to use passwords that may be more easily remembered but, equally, are more easily guessed.

Accordingly, there is a need to provide methods and systems for electronic delivery of essential mail items that overcome, or at least mitigate, the aforementioned technical and other problems of the prior art. In particular, it would be highly desirable to provide such a system which is operable over publicly-accessible data networks, such as the Internet, in order to maximise convenience and accessibility, while at the same time not compromising security and avoiding the many drawbacks of the existing email system.

BRIEF SUMMARY OF THE INVENTION

In one aspect, the present invention provides a method of providing an electronic mail service for the delivery of essential mail items to a subscriber in electronic form, the method including the steps of: providing a delivery server having an associated database containing subscriber details;

the delivery server receiving from the subscriber a nomination of at least one service provider from which the subscriber wishes to receive essential mail items in electronic form, and storing said nomination in the database in association with the subscriber details;

establishing a trusted communications channel between the delivery server and a service provider computer system;

the delivery server receiving essential mail data from the service provider via said communications channel; the delivery server verifying that the subscriber wishes to receive an essential mail item corresponding with the essential mail data in electronic form, by comparison with subscriber details and nominations stored in the database; and in the event that said verification is successful, the delivery server delivering the essential mail item to the subscriber in electronic form.

Advantageously, the invention thereby provides a technical solution which substantially parallels in many respects the conventional mail delivery system. For example, the delivery server may be seen as analogous to a post office. The service provider computer system may be compared with a conventional post box, from which the postal service (i.e. the delivery server) collects mail items for delivery to subscribers. The verification process performed by the delivery server is somewhat analogous with the conventional mail sorting process, insofar as it provides confirmation that recipient subscriber details are legitimate before any attempt is made to deliver a mail item. The method also has in common with the conventional postal service that it is a centrally-controlled, unidirectional delivery service which may thus enable abuse of the service to be avoided. Unlike the regular email system, it is not possible for any party in possession of identifying details of a subscriber (e.g. the equivalent of an email address) to send items to that subscriber. Similarly, subscribers may not freely send items to one another. Rather, only those items that have passed verification by the delivery server, and that correspond with nominations made by the recipient subscriber, may be delivered to that subscriber. In this respect, it will be appreciated that subscribers have an added degree of control as compared with the conventional postal system.

It is particularly advantageous for the method, and the delivery server, to be operated, sponsored, endorsed or otherwise backed by a trusted entity or authority. In this case, the technical features of the method which provide enhanced security as compared with other online delivery schemes may be reinforced by the sense of trust that consumers may feel for the operating or sponsoring entity. For example, a method and delivery server in accordance with an embodiment of the invention may be operated or sponsored by an established trusted authority, such as a national postal service provider.

As will therefore be appreciated, the invention is advantageously able to mitigate or substantially eliminate the issues relating to security and trust of electronic delivery systems that presently cause concern to users of the conventional postal system, and prevent a higher level of uptake of electronic delivery services. This is anticipated to result in corresponding increase in the acceptance and use of electronic delivery of essential mail items. The follow-on benefits of this are expected to include: a very substantial reduction in delivery delays and costs experienced by service providers; significant environmental benefits resulting from reductions in resource utilisation, including paper consumption and the resources expended in the physical generation and delivery processes generally required by conventional (postal) methods; and consequential further economic and social benefits.

It is to be understood that, in the context of the invention, the term "service provider" is to be interpreted broadly. Clearly, entities such as financial institutions (banks), telephone and utility companies, and other providers of particular goods or services are encompassed by the term "service provider". However, the importance, relevance or "essentiality" of information provided by different individuals or entities is a matter for each subscriber, in view of the fact that subscribers are able to control their nominations of service providers from which they will receive essential mail items. At the very least, any entity or individual nominated by a subscriber is a "service provider" at least insofar as the sending of the mail items requested by the subscriber is, in itself, a service, and these mail items are "essential" to the subscriber in that they have been nominated as such.

In accordance with preferred embodiments of the invention, the identity of the subscriber is authenticated prior to entering of subscriber details into the database. Accordingly, the method preferably includes, prior to the delivery of any essential mail items to the subscriber, an authentication process which includes the steps of:

receiving a subscription request from the subscriber, the subscription request including subscriber information enabling the identity of the subscriber to be validated;

validating the identity of the subscriber using the subscriber information; and in the event that subscriber validation is successful, accepting the subscription request and creating a corresponding subscriber entry in the database, otherwise rejecting the subscription request.

Subscriber information may include identity documents, such as a passport, birth certificate, social security number, healthcare care, identity card, and so forth, as appropriate. It will be appreciated that in any given jurisdiction, suitable validation benchmarks either exist, or may be established, to enable the reasonable authentication of a subscriber. For example, in Australia the so-called "100 point" system may be employed, wherein various different types of identifying information and documentation are ascribed differing point values, and a combination of documents having a total point value of at least 100 points must be presented before the holder's identity is considered to have been validated. It will be understood that, in at least some cases, the validation step may require the intervention of a human operator to perform checking of documentation. However, it is readily foreseeable, particularly with advances in electronic identification documents, including chip-cards and biometric passports, that the validation step could, in some embodiments, be completely automated.

Preferably, the subscriber is allocated, and may be identified by, a unique subscriber identifier. The allocated subscriber identifier may be associated with the subscriber details, nominations, and other subscriber data, held in the database. The subscriber identifier may then be used as a means of identifying the subscriber, for example by nominated service providers, and provides a means for referencing and accessing subscriber information held in the database. In some embodiments, there may be more than one identifier, or reference code, associated with each subscriber. Within this specification, the identifier provided to service providers to enable delivery of essential mail items is also known as a "trust key".

A variety of different algorithms may be employed to generate and allocate a unique identifier to each subscriber. For example, a unique random number may be generated and allocated to a new subscriber. Alternatively, cryptographic techniques may be used to generate a unique subscriber identifier based upon various personal details of the subscriber. Still a further alternative is to construct a unique subscriber identifier from a combination, or concatenation, of subscriber details. For example, a unique subscriber identifier for a US-based subscriber may include the subscriber's Social Security Number. In the case of an Australian subscriber, the subscriber's Tax File Number may be utilised either alone, or in combination with other elements. Various other methods for generating a unique subscriber identifier will be apparent to those skilled in the relevant art.

It is particularly preferred that the method be Internet-based, i.e. that the delivery server is provided having a connection to the Internet, such that subscriber nominations and other subscriber information, as well as essential mail data and essential mail items, may be transferred to and from the delivery server via the Internet. Advantageously, this enables subscribers and service providers to make use of the method, and the delivery server, from any location at which Internet access is provided.

However, as is well known, a disadvantage of providing global access via the Internet is the potential for breaches of security of the delivery server. Accordingly, it is considered particularly desirable that the delivery server be provided with access to the Internet via a suitably configured firewall. Various methods and apparatus for providing electronic firewalls satisfying the security and integrity requirements of the delivery server are well known in the relevant art, and therefore will not be described in detail herein.

In accordance with one embodiment of the invention, the step of establishing a trusted communications channel includes the delivery server initiating a connection with the service provider computer system. For example, the delivery server may connect to the service provider computer system via the Internet in accordance with the File Transfer Protocol (FTP), or SSH File Transfer Protocol (SFTP), or indeed any other suitable protocol. Secure protocols, such as SFTP, are preferred, since these enable the essential mail data to be encrypted during transfer, so as to protect the data from possible eavesdropping.

Advantageously, having the delivery server initiate the connection enhances the overall security and integrity of the system since it avoids the need for the delivery server to accept incoming connections from unauthenticated service providers. As will be appreciated, allowing incoming connections implies a limitation on the configuration of the firewall, and considering that an initial connection request must be considered untrusted until subsequently verified opens a potential security hole in the system. Conversely, by employing a method in which the delivery server initiates connections to the service provider computer system, it is possible to ensure that the trusted communications channel thereby established is always initiated with a known and trusted service provider.

While there are clear advantages to initiation of secure, trusted communications by the delivery server only, it will be appreciated that methods providing comparable levels of security and trust may be provided wherein the service provider initiates the connection. For example, a connection initiated by the service provider computer system may initially be accepted, and an authentication process employed to verify the identity of the service provider computer system prior to allowing further access to the delivery server. Suitable authentication methods include password-based authentication, cryptographic techniques, and/or "challenge"-based methods. If desired, authentication may be performed at the firewall level, thereby minimising the prospects of a security breach of the delivery server via an unauthenticated communications link.

Although perhaps a less preferred option, it is also possible for essential mail data to be transferred from the service provider to the delivery server via email, i.e. the trusted communications channel may include an email channel. Techniques for authenticating the source of data, such as digital signatures, may be used to confirm the identity of the service provider purportedly sending essential mail data via email, to ensure the trusted status of the channel.

Yet a further possible approach to ensuring the security of the trusted communications channel is to employ private lines, such as telephone lines, whereby an incoming or outgoing telephone number provides an assurance of the identity of the corresponding service provider computer system.

The essential mail data received by the delivery server via the trusted communications channel may be a formatted copy of the essential mail item itself, in a form suitable for delivery to the subscriber. Alternatively, the essential mail data may be data specifying content of the essential mail item, and requiring further formatting prior to delivery to the subscriber. For example, in some embodiments the delivery server may utilise statement formatting software or engage a third-party to format essential mail data received from a service provider into mail items, such as financial statements, invoices, utility bills or the like, having a desired format or appearance. The essential mail items may be delivered to the subscriber in any convenient file format, including plain text, PDF, HTML, XML, GIF, JPEG, or any other desired file type, in accordance with requirements and/or subscriber preferences.

In the embodiments involving a third-party for data formatting, the service provider or the delivery service may provide essential mail data to a data server which sends an electronic notification to the third party that data is awaiting formatting. The third-party may then access the data server, verify subscriber details, and then download and format the essential mail data to produce a final formatted document, i.e.

the essential mail item. Formatting the data may include merging the data with a document template to create the document to be delivered to the subscriber. It also be appreciated that database functions such as deduplication, name and address cleansing and segmentation may also occur.

The step of the delivery server verifying that the subscriber wishes to receive the essential mail item preferably includes checking the subscriber nominations in the database to confirm that the subscriber indeed wishes to receive essential mail items from the service provider. Further verification may include comparing customer details provided by the service provider with the corresponding customer details held in the database, as an additional check that the subscriber is the intended recipient of the essential mail item.

As will be appreciated, various means and methods for the delivery server delivering the essential mail item to the subscriber in electronic form are available. For example, the delivery server, or an associated web server, may provide a web-based interface, such as an interface similar to existing web-mail interfaces, for enabling the subscriber to access and download essential mail items. Alternatively, or additionally, the delivery server, or an associated email server (e.g. a POPS server) may enable the subscriber to receive essential mail items using a standard email client application. Still a further alternative is to forward the essential mail item to a nominated email address of the subscriber via email, either in-line within an email message, or as an attachment. Other delivery methods will also be apparent to persons skilled in the relevant art.

Naturally, it is to be understood that the method is extensible to a large number of subscribers and service providers, limited only by the storage capacity, communications bandwidth, and processing capacity of the delivery server. As will be appreciated, all of these technical characteristics are scalable, for example by providing a multi-processor server, or server farm, high bandwidth communications interfaces, and additional external storage media. Accordingly, the invention encompasses embodiments including a method of providing an electronic mail service for the delivery of essential mail items to a plurality of subscribers in electronic form, the method including the steps of:

providing a delivery server having an associated database containing subscriber details;

the delivery server receiving from each of the plurality of subscribers a nomination of at least one service provider from which each subscriber wishes to receive essential mail items in electronic form, and storing said nominations in the database in association with the corresponding subscriber details;

the delivery server establishing, for example concurrently, sequentially or on demand, a plurality of trusted communications channels with a corresponding plurality of service provider computer systems;

the delivery server receiving from each of said service provider computer systems essential mail data from each service provider via the corresponding communications channel;

for each item of essential mail data, the delivery server verifying that a corresponding recipient subscriber wishes to receive a corresponding essential mail item in electronic form, by comparison with subscriber details and nominations stored in the database; and in the event that each said verification is successful, the delivery server delivering the corresponding essential mail item to the corresponding subscriber in electronic form.

In another aspect, the present invention provides a delivery server for the delivery of essential mail items to a subscriber in electronic form, the delivery server including:

at least one processor;

a database containing subscriber details including at least one nominated service provider from which the subscriber wishes to receive essential mail items in electronic form;

at least one data communications interface operatively coupled to the processor; and at least one storage medium operatively coupled to the processor, the storage medium containing program instructions for execution by the processor, said program instructions causing the processor to execute the steps of: [0050] establishing via the data communications interface a trusted communications channel with a service provider computer system;

receiving essential mail data from the service provider via said communications channel;

verifying that the subscriber wishes to receive an essential mail item corresponding with the essential mail data in electronic form, by comparison with subscriber details and nominations stored in the database; and in the event that verification is successful, delivering the essential mail item to the subscriber in electronic form.

Preferably, the data communications interface provides a connection to the Internet. Most preferably, the connection to the Internet is provided via a firewall. Additional or alternative data communications interfaces may be provided for communication with the service provider computer system and/or for delivery of essential mail items, including private subscriber lines e.g. telephone lines.

The storage medium preferably contains further program instructions for execution by the processor, said further program instructions causing the processor to execute a method for generating a unique subscriber identifier associated with the subscriber. Advantageously, such a unique subscriber identifier is generated and associated with the subscriber following an initial registration or authentication process.

According to some embodiments the storage medium may contain program instructions for implementing the step of establishing a trusted communications channel by initiating an outgoing connection, for example using the File Transfer Protocol (FTP), with the service provider, or alternatively for accepting and authenticating an incoming connection request from the service provider.

The storage medium may further contain program instructions for execution by the processor, which cause the processor to execute the step of formatting an essential mail item based upon the essential mail data received from the service provider. Advantageously, in such embodiments the service provider need not be responsible for formatting of data, or for the production of essential mail items in finished form suitable for delivery to the subscriber.

In yet another aspect, the present invention provides a delivery server for the delivery of essential mail items to a subscriber in electronic form, the delivery server including:

a database containing subscriber details including at least one nominated service provider from which the subscriber wishes to receive essential mail items in electronic form;

means for establishing a trusted communications channel with a service provider computer system;

means for receiving essential mail data from the service provider via said communications channel;

means for verifying that the subscriber wishes to receive an essential mail item corresponding with the essential mail data in electronic form, by comparison with subscriber details and nominations stored in the database; and means for delivering the essential mail item to the subscriber in electronic form, in the event that said verification is successful.

The delivery server is preferably computer-implemented, and the means for receiving a nomination from the subscriber may include suitable interface hardware of the server for interfacing to a communications network, such as the Internet, and may further include one or more software components executed by at least one processor of the server computer including instructions to effect the corresponding functionality.

Similarly, the means for establishing a secure, trusted communications channel may include the same, or additional interface hardware for interfacing to a communications network, and one or more software components executed by the processor for establishing the communications channel.

Furthermore, the means for verifying that the subscriber wishes to receive the essential mail item also preferably includes one or more software components executed by the processor, for performing appropriate comparisons with information stored in the database.

The means for delivering the essential mail item to the subscriber may also include corresponding software components executed by the processor, and may further include suitable interface hardware for interfacing to a communications network, such as the Internet, utilised by the subscriber for receiving essential mail items.

In yet another aspect, the present invention provides a method of a subscriber receiving an essential mail item from a service provider, the method including the steps of:

the subscriber transmitting, to a delivery server having an associated database containing subscriber details, a nomination of at least one service provider from which the subscriber wishes to receive essential mail items in electronic form, wherein the delivery server stores said nomination in the database in association with the subscriber details; and the subscriber subsequently receiving an essential mail item from the nominated service provider in electronic form, wherein delivery of the essential mail item to the subscriber is effected by the delivery server executing the steps of:

establishing a trusted communications channel with a service provider computer system;

receiving essential mail data from the service provider via said communications channel;

verifying that the subscriber wishes to receive an essential mail item corresponding with the essential mail data in electronic form, by comparison with subscriber details and nominations stored in the database; and in the event that verification is successful, delivering the essential mail item to the subscriber in electronic form.

Further preferred features and advantages of the invention will be apparent to those skilled in the art from the following description of preferred embodiments of the invention, which should not be considered to be limiting of the scope of the invention as defined in the preceding statements, or in the claims appended hereto.

BRIEF DESCRIPTION OF THE DRAWINGS

Preferred embodiments of the invention will now be described with reference to the accompanying drawings, wherein like reference numerals refer to like features, and in which.

DETAILED DESCRIPTION OF THE INVENTION

Figure 1A:
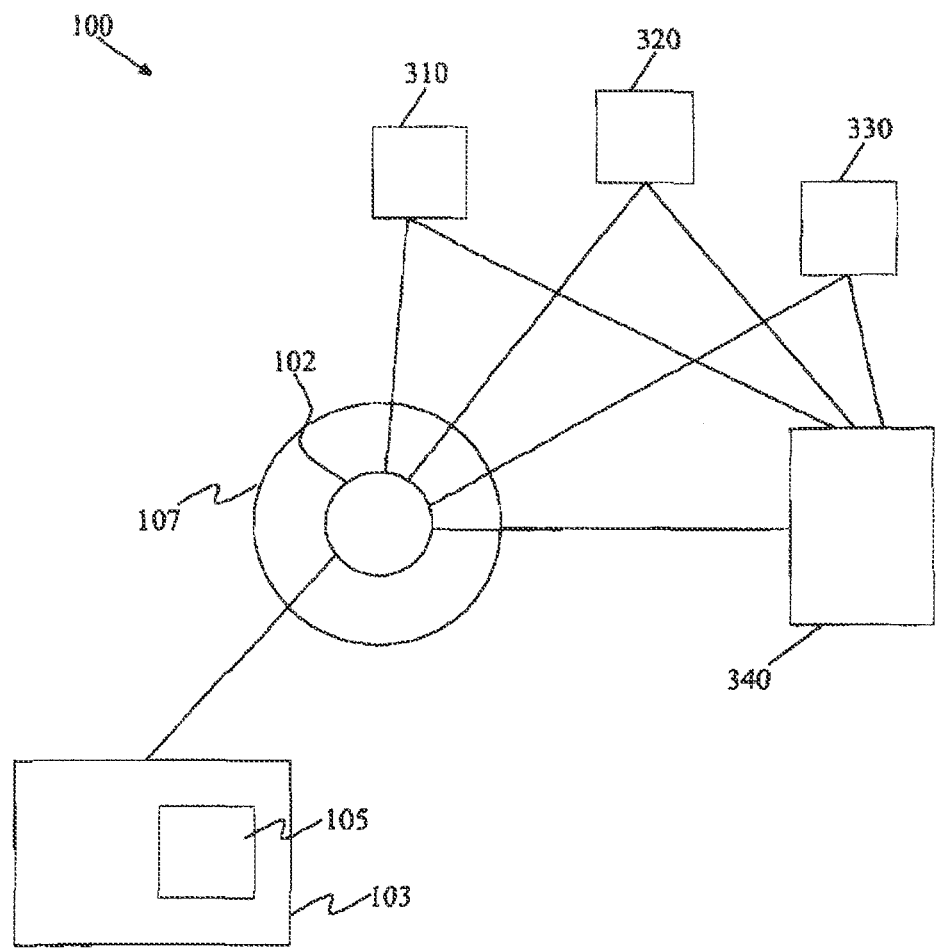
FIG. 1A is a schematic diagram of a system for electronically delivering essential mail items in accordance with a preferred embodiment of the invention.
Figure 1B:
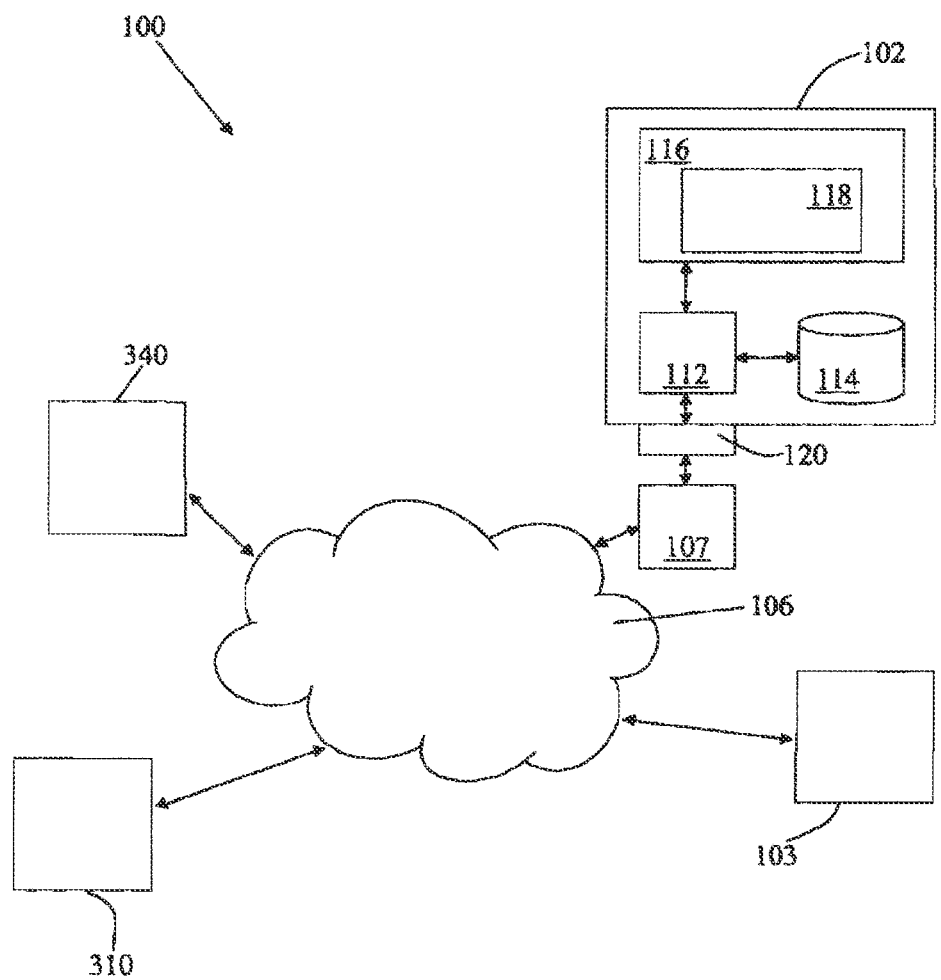
FIG. 1B is a block diagram illustrating a delivery server within an Internet-based implementation of the system of FIG. 1A.

According to preferred embodiments of the present invention, there are provided methods and apparatus for the delivery of essential mail items to subscribers in electronic form. FIGS. 1A and 1B show schematic diagrams of an exemplary system 100 in accordance with the invention. FIG. 1A illustrates the logical connectivity between various components of the system 100, while FIG. 1B is a block diagram illustrating an Internet-based implementation of the system 100.

The system 100 includes a delivery server 102, which in preferred embodiments is a computer or computer system including one or more central processing units 112 operatively associated with a database 114. The database 114 includes subscriber details, and other subscriber data, as described in greater detail below. The delivery server computer system 102 further includes at least one storage medium 116, such as random access memory (RAM), read only memory (ROM), flash memory, magnetic storage devices (e.g. hard-disk drives), optical storage devices (e.g. CD-ROM or DVD-ROM devices), and/or any combination of the foregoing. The memory or other storage medium 116 contains program instructions 118 for execution by the processor 112, in order to implement the desired functionality of the delivery server 102 in accordance with a preferred embodiment of the invention. As will be appreciated, the program instructions 118 stored within memory and/or other storage media 116 also include executable instruction code, such as operating system code, for controlling and interfacing with various peripherals of the computer system 102, and for providing any other desired functions of the system, in accordance with conventional computer operating methods.

The delivery server computer system 102 also includes a data communications interface 120 operatively coupled to the processor 112. The data communications interface 120 is preferably a broadband network interface, such as an Ethernet interface, configured to provide connectivity to the Internet 106. However, in various embodiments the data communications interface 120 may be any suitable interface, or may be a plurality of interfaces, such as private line interfaces, telephone (modem) interfaces, wired broadband (e.g. ADSL or cable modem) interfaces, wireless network interfaces, and so forth.

As noted above, according to preferred embodiments the delivery server 102 includes a network interface 120 providing connectivity to the Internet 106. In such embodiments, it is particularly preferred that connectivity to the Internet 106 is provided via a firewall 107, in order to prevent unauthorised access to, or malicious attacks upon, the delivery server 102.

Connectivity is available between the delivery server 102, for example via the Internet 106, and one or more service providers, e.g. 310, 320, 330. Connectivity is also provided between the delivery server 102 and subscribers (not shown) for example via subscriber computer 103, or other Internet-enabled subscriber devices (e.g. portable or handheld computers, Internet-enabled mobile phones, PDAs, and so forth).

Connectivity is also available between service providers 310, 320, 330, the delivery server 102, and third-party information formatting service provider, or data warehouse, 340.

The purpose of the system 100 is to provide one or more subscribers with a service for delivering essential mail items in electronic form, for example via email or other convenient means to subscriber device 103. It is a particular feature of the delivery system 100 that the subscriber is able to nominate the service providers, e.g. 310, 320, 330, from which the subscriber wishes to receive essential mail items, and that the system 100 does not support the general exchange of electronic mail, or other electronic information, to or from the subscriber device 103. Rather, the purpose of the system 100 is particularly to deliver only essential mail items required by the subscriber from nominated service providers.

Figure 2:
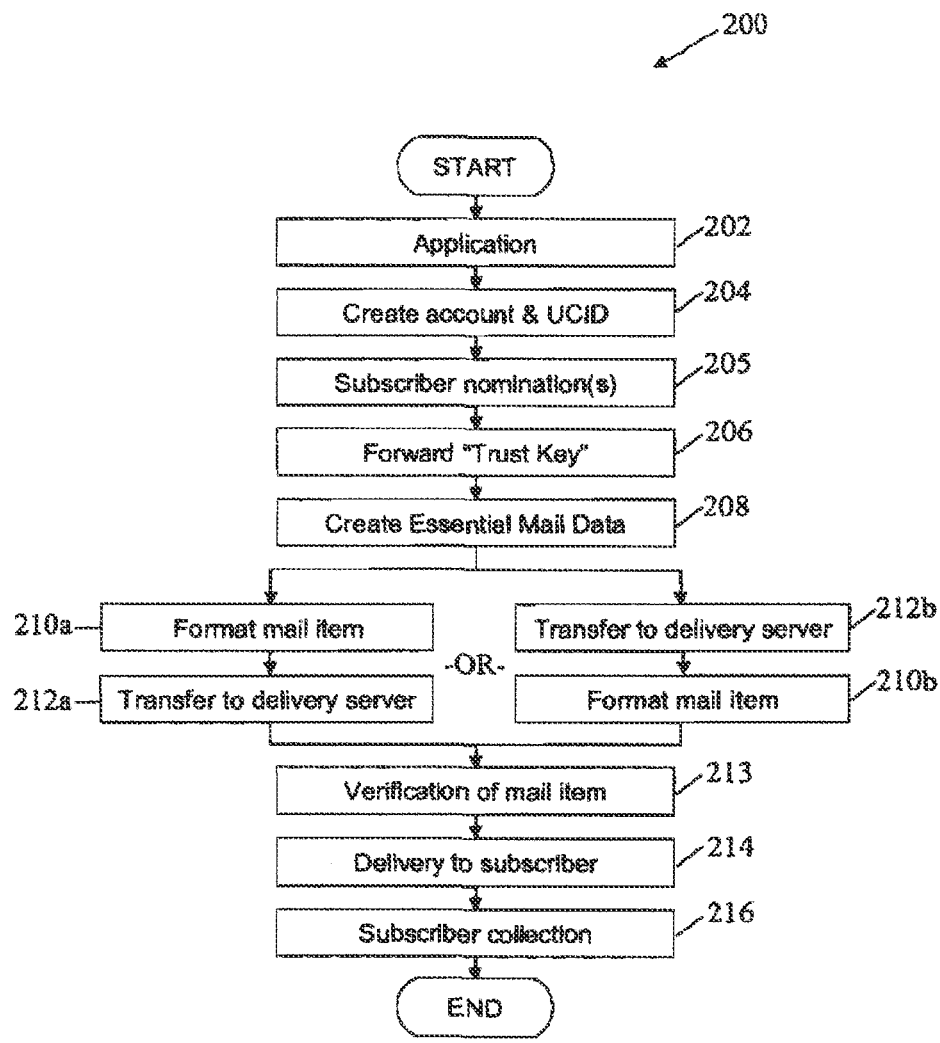
FIG. 2 is a flowchart illustrating steps in a method for electronically delivering essential mail items according to a preferred embodiment of the invention.

Referring now to FIG. 2, the flowchart 200 shows one example illustrating steps in a method for electronically delivering essential mail items to a subscriber in accordance with a preferred embodiment of the invention. At step 202, a prospective subscriber makes an application to register with the delivery server 102. The application process is described in greater detail below with reference to FIGS. 4 to 7, however in summary a subscriber application typically includes subscriber details, such as name, address and other contact information, and preferably further includes details suitable for validation of the subscriber's identity, such as passport details, Tax File Number, Social Security Number, date of birth, and/or other information or documents suitable for validating or authenticating identity. Once the application is processed, and accepted, a subscriber account, and a corresponding unique subscriber identifier and unique "trust key" is created at step 204.

At step 205, the subscriber nominates one or more service providers, e.g. 310, 320, 330, from which the subscriber wishes to receive essential mail items in electronic form. At step 206, the delivery server 202 notifies the nominated service providers and forwards the subscriber's trust key to each nominated provider. Henceforth, the nominated service providers are able to deliver essential mail items to the subscriber, via the delivery server 102, for as long as the subscriber's nomination and/or the subscriber's trust key remains valid.

At step 208, the nominated service provider generates essential mail data, corresponding with an essential mail item, for delivery in electronic form to the subscriber. Nominated service providers may include banks, telephone companies, other utility service providers, or indeed any service provider registered with the delivery server 102 for nomination by subscribers. The essential mail items may include financial statements, bills, invoices, or any other information of particular interest and/or value to the subscriber, and which the subscriber has therefore nominated as "essential". Essential mail data may therefore consist of information relating to financial statements, invoices, bills, or any other information requested or required by the subscriber.

In general, the essential mail data is "content", which may require further formatting before being delivered to the subscriber as an essential mail item. The step of formatting 210a, 210b may be performed before or after the step 212a, 212b of transferring the essential mail data/item to the delivery server 102, as indicated by the alternative branches in the flowchart 200. Formatting may be performed before transfer to the delivery server, by the service provider 310, 320, 330, or may be performed after transfer, by the delivery server 102. Alternatively, formatting may be performed either before or after transfer by a third-party provider 340. For example, in some embodiments the delivery server 102 may utilise statement formatting software, or may engage third-party provider 340, to format essential mail data received from a service provider 310, 320, 330 into mail items, such as financial statements, invoices, utility bills or the like, having a desired format or appearance. Data may be transferred to the third-party provider 340 either by the service providers 310, 320, 330 or by the delivery server 102, for formatting. Formatting the data may include merging the data with a document template to create the formatted essential mail item to be delivered to the subscriber. Formatted mail items may be transferred back to the service providers 310, 320, 330, and thereafter to the delivery server 102, or may be transferred directly from the third-party provider 340 to the delivery server 102. The step 212a or 212b of transferring essential mail data/items to the delivery server 102 is performed by establishing a trusted communications channel between the delivery server 102 and a corresponding service provider computer system, and then the delivery server 102 receiving the essential mail data/item from the service provider, e.g. 310, 320, 330 via the trusted communications channel. Establishment of a trusted communications channel, and transfer of essential mail data, is described in greater detail below with reference to FIGS. 8A to 8D.

At step 213, the delivery server 102 verifies that the subscriber wishes to receive the essential mail item corresponding with the essential mail data transferred from the service provider, by checking details of the service provider and/or the essential mail data against subscriber nominations stored in the database 114. if the verification step 213 is successful, then at step 214 the essential mail item is delivered to the subscriber. Finally, at step 216 the subscriber collects the essential mail item in electronic form, for example using a PC or other device 103. As will be appreciated, various means and methods for the delivery server 102 delivering the essential mail item to the subscriber in electronic form, and for the subscriber collecting the essential mail item, are available. For example, the delivery server 102, or an associated web server, may provide a web-based interface, such as an interface similar to existing web-mail interfaces, for enabling the subscriber to access and download essential mail items. Alternatively, or additionally, the delivery server, or an associated email server, may enable the subscriber to receive essential mail items using a standard email client application 105. Still a further alternative is to forward the essential mail item to a nominated email address of the subscriber via email, either in-line within an email message or as an attachment. In this case, the subscriber once again collects the essential mail item via a conventional email application 105.

Figure 3:
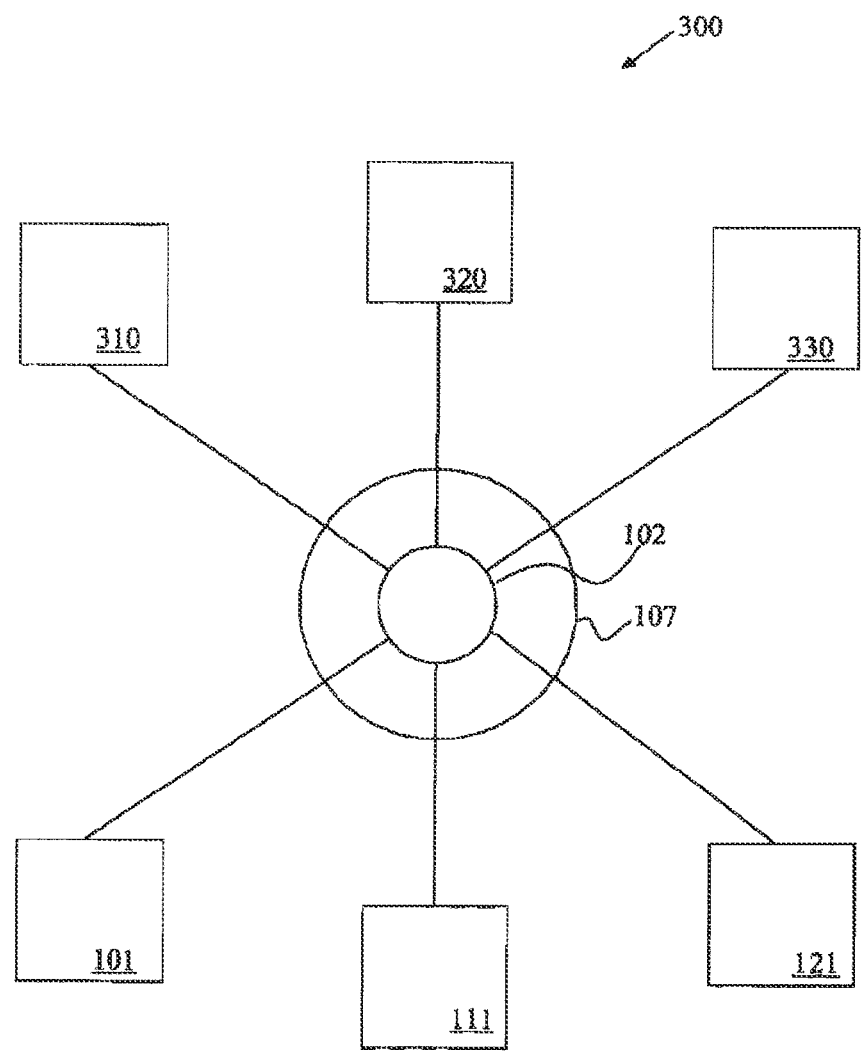
FIG. 3 is a schematic diagram illustrating an exemplary system including multiple subscribers and service providers.

While the foregoing description, with reference to FIGS. 1A, 1B and 2, illustrate the operation of the system 100 and delivery server 102 from the perspective of a single subscriber, it will be appreciated that this is exemplary only of the general operation of the system 100 and delivery server 102, which provide a service for electronic delivery of essential mail items to a plurality of separate subscribers. This is illustrated by the schematic diagram 300 of FIG. 3, which shows a system including multiple subscribers and service providers. The system 300 includes delivery server 102, a plurality of subscribers, e.g. 101, 111, 121, and a plurality of service providers, e.g. 310, 320, 330. The database 114 associated with delivery server 102 includes subscriber details corresponding with each of the plurality of subscribers. Each subscriber is able to nominate at least one service provider from which the subscriber wishes to receive essential mail items in electronic form, and the delivery server 102 maintains a record of such nominations within the database 114. Service providers 310, 320, 330 are advised of subscriber nominations, and provided with corresponding subscriber trust keys to enable the subsequent delivery of essential mail items to the corresponding subscribers. Thereafter, the delivery server 102 establishes, for example concurrently, sequentially or on-demand, trusted communications channels with each of the service providers 310, 320, 330 as required. The delivery server 102 receives essential mail data from the corresponding service provider computer systems, via the respective trusted communications channels, checks subscriber details associated with the essential mail data, and delivers verified essential mail items in electronic form to the appropriate subscriber, e.g. 101, 111, 121. From the perspective of each subscriber, the overall process of application, registration, nomination, delivery and collection of essential mail items is as described above with reference to FIGS. 1 and 2.

Figure 4:
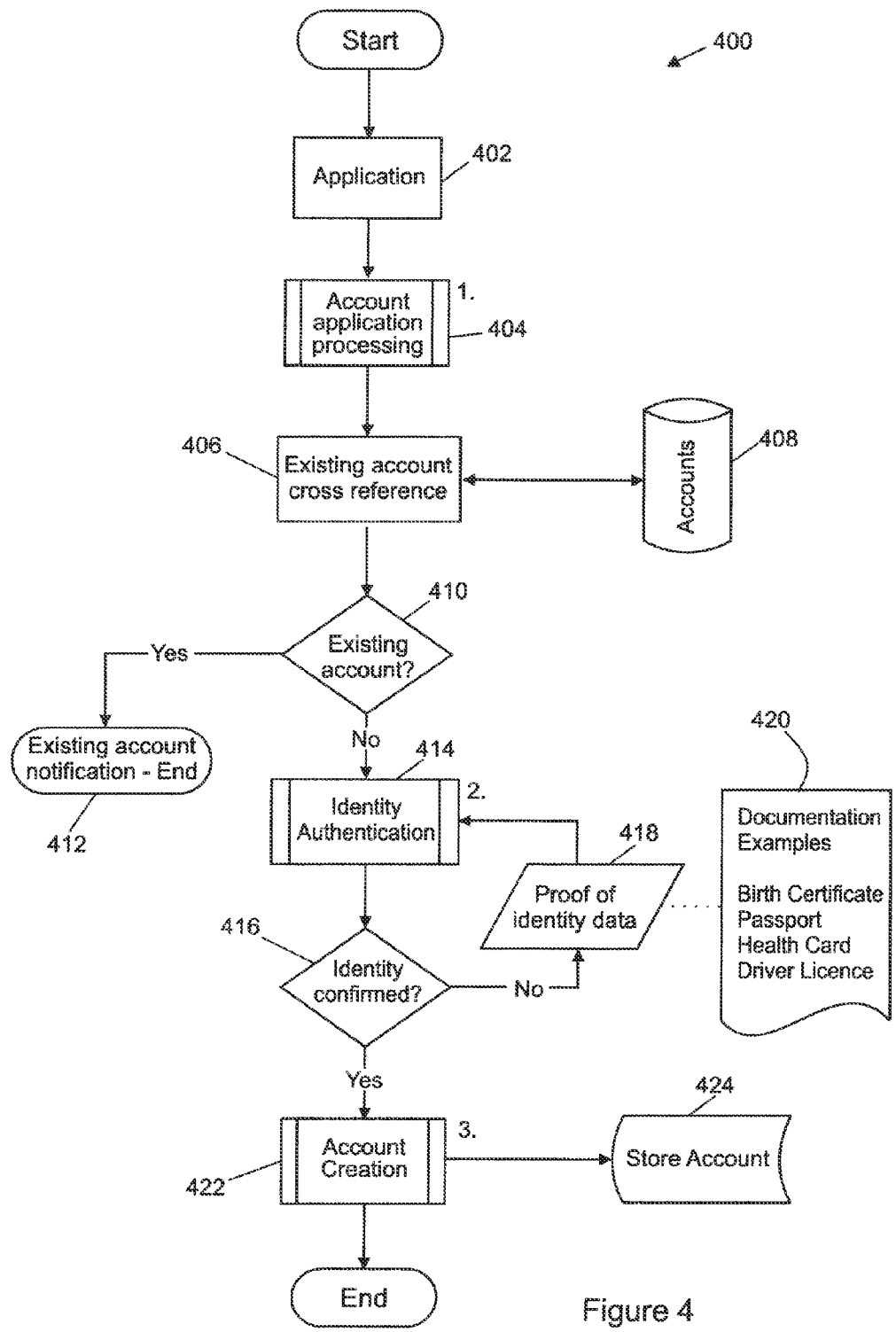
FIG. 4 is a flowchart of an exemplary application and account creation process according to an embodiment of the invention.

FIG. 4 is a flowchart 400 of an exemplary application and account creation process according to a preferred embodiment of the invention. At step 402, a potential subscriber submits an application for registration with the delivery server, and application processing occurs at step 404. The application processing step 404 is described in greater detail below with reference to FIG. 5. Following successful processing of the application, at step 406 the prospective subscriber details are cross-referenced with existing subscriber account details held in the account database 408. If it transpires that the application corresponds with an existing subscriber, then there is no need to create a new account, and in accordance with decision 410 the process is directed to step 412, in which a notification is generated that the account already exists, and the application process is terminated.

Given that the application corresponds with a new account, an attempt is made to authenticate or validate the identity of the subscriber, at step 414. As will be appreciated, following successful registration the new subscriber will be entitled to request and receive essential mail items generated by a variety of service providers, including financial institutions, telephone companies, utility companies and the like, and much of this essential information is of a highly sensitive and personal nature. Accordingly, identity authentication step 414 is of substantial practical importance in preferred embodiments of the invention, to ensure that unscrupulous parties do not manage to register as subscribers under false or assumed identities, for fraudulent purposes. An exemplary process of identity authentication 414 is described in greater detail below with reference to FIG. 6.

In the case in which identity authentication 414 fails, the decision step 416 passes control to step 418, which provides an opportunity for additional proof of identity data and/or documentation to be provided. For example, if identity authentication step 414 has failed only because the prospective subscriber has provided insufficient evidence or proof of identity, a further attempt at authentication may be successful if additional information is supplied. For example, the unsuccessful applicant may be able to additionally provide documentation 420, such as a birth certificate, passport, health card, driver's license, and so forth, as additional evidence of identity.

Once the identity of the prospective subscriber has been adequately confirmed, decision step 416 passes control to account creation step 422. Further detail of a preferred account creation process is described below with reference to FIG. 7. At step 424 the new account details are stored, concluding the application and account creation process 400.

Figure 5:
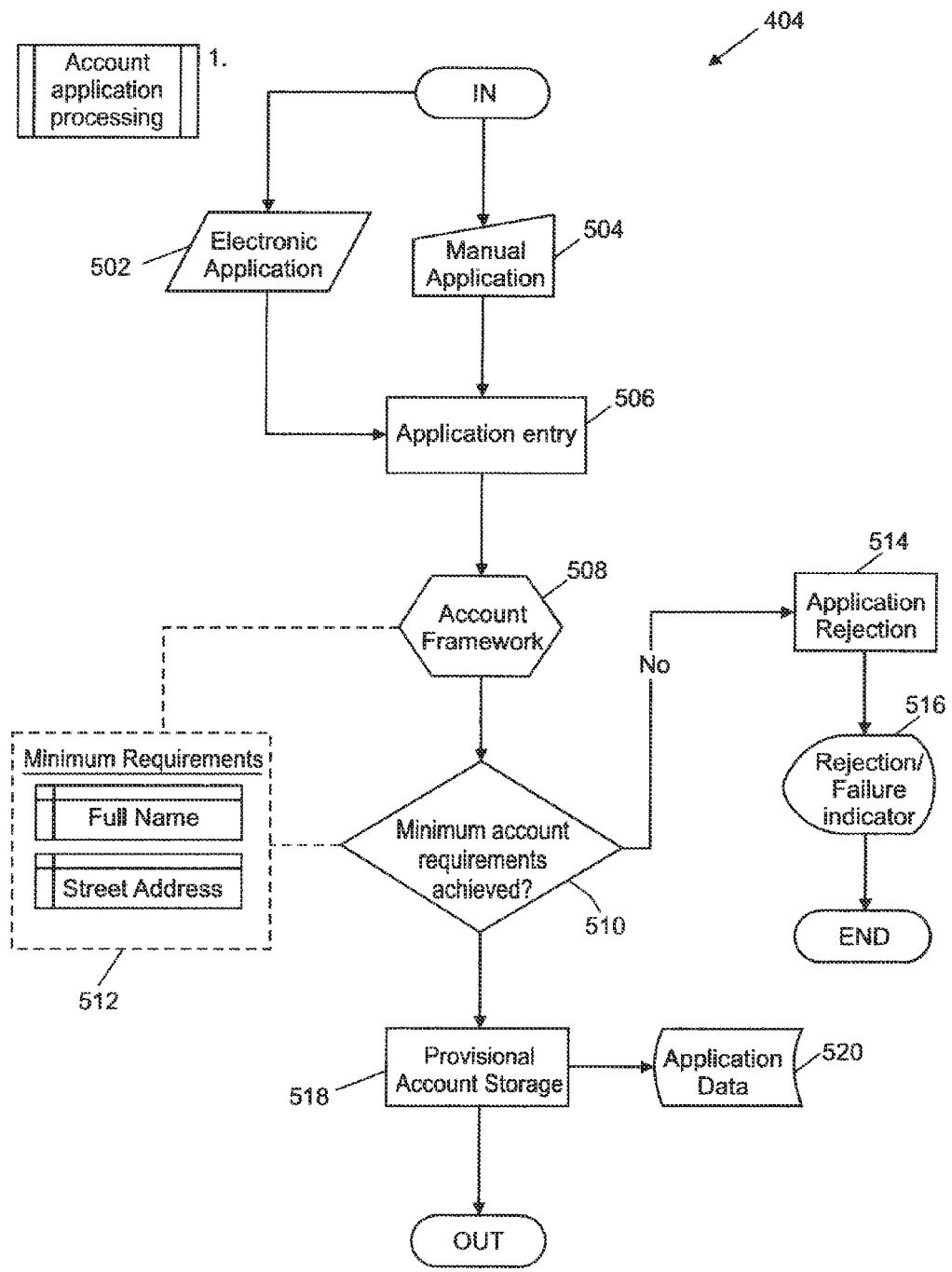
FIG. 5 is a flowchart of account application processing according to an embodiment of the invention.

FIG. 5 is a flowchart showing further detail of a preferred embodiment of account application processing 404. According to the embodiment represented by the flowchart, a new subscriber application may be either an electronic application 502, or a manual application 504. For example, an electronic application may be made online, for example by the prospective subscriber completing a web-based form. Alternatively, a manual application 504 may include the use of a physical form, which is completed by the prospective subscriber, and submitted in person or via mail to an operator of the mail delivery server. Whichever form of application is provided, at step 506 the application is processed, for example by extracting required details from the electronic or physical application form, in order to establish required information of the prospective subscriber for completion of application processing and account creation.

Each subscriber account is created and maintained in accordance with an account framework 508, which establishes the various subscriber details and other subscriber information associated with the account, and stored within the database 114 in accordance with corresponding data structures. The account framework 508 includes a minimum set of requirements for the creation and maintenance of an account, and at decision step 510 a comparison is performed between the application data that has been translated into the account framework 508, and the minimum requirements 512 for continued processing of the application. As illustrated in process 404, the minimum requirements for proceeding with the application are the provision by the prospective subscriber of a full name and corresponding street address. If this minimum information is not included within the application, then it is rejected at step 514, and an indication of failure generated at step 516. The application process is thereby terminated, and if the prospective subscriber wishes to do so, they may reapply providing the required information that was omitted from the initial application.

If the minimum requirements are satisfied, then at step 518 a provisional account record is created, and stored as application data 520. It is to be understood that, at this point, no account has been created, and that the provisional account data will only be converted into a functional subscriber account following successful identity authentication and account creation, as described below with reference to FIGS. 6 and 7.

Figure 6:
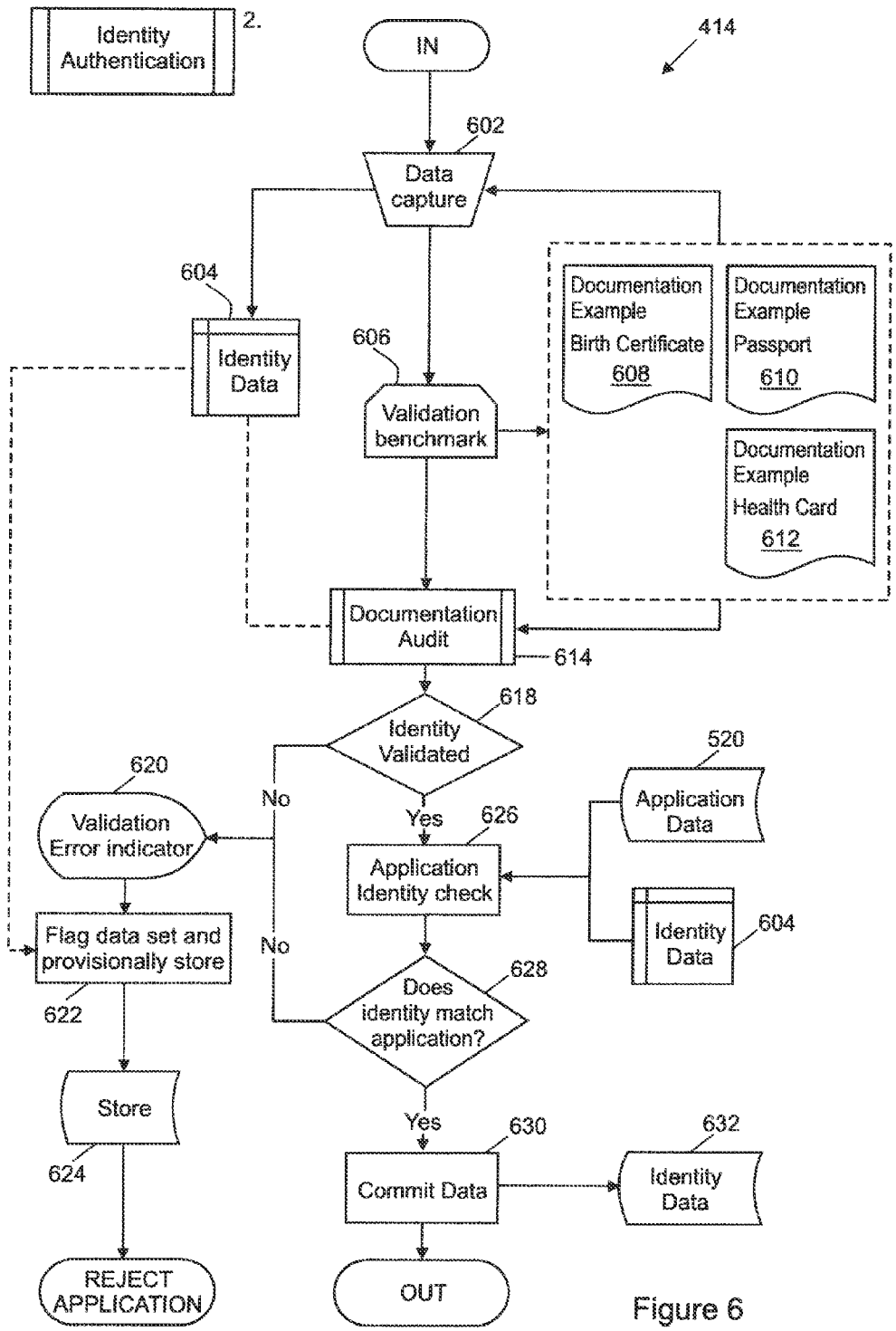
FIG. 6 is a flowchart of identity authentication according to an embodiment of the invention.

FIG. 6 is a flowchart illustrating identity authentication 414, according to a preferred embodiment of the invention. As will be recalled from the foregoing discussion in relation to the flowchart 400 in FIG. 4, the inputs to the identity authentication process 414 are the provisional account details, and proof of identity data and/or documentation. Accordingly, the first step 602 of the identity authentication process 414 is data capture of the proof of identity information. This step may typically involve manual checking of physical documentation provided by the prospective subscriber, such as a passport, driver's license, birth certificate and/or other identifying information or documentation. It will be appreciated, however, that with suitable advances in technology the need for manual checking and data entry may be reduced or eliminated, as secure forms of electronic identification are increasingly developed and deployed. The identity data captured in step 602 is stored in an identity data record 604.

Step 606 represents a so-called "validation benchmark" process. The validation benchmark is some appropriate standard against which the persuasiveness of the proof of identity data or documentation may be measured, so as to provide a formal and uniform standard of proof of identity. As will be appreciated, the validation benchmark may be context dependent, and in particular may be different in different countries and/or legal jurisdictions. As a general rule, however, a suitable standard of proof of identity will depend upon the prospective subscriber providing at least one highly persuasive and trusted form of identification, which is necessarily difficult to falsify, with a common example of such identification being a passport. Typically, further information or documentation, perhaps having lower persuasive weight when considered individually, will also be required as a corroboration before the authenticity of the prospective subscriber's identity is established. Further documentation and/or information that would be considered acceptable includes driver's license, birth certificate, healthcare card, bank account details, copies of residential utility bills and the like, as well as jurisdictionally-specific personal data such as a Social Security Number (US), or a Tax File Number (Australia), or the equivalent.

Without limitation, the Australian "100-point" validation benchmark is now described, by way of example. Under this system, primary forms of identification, allocated a point value of 70, include passport 610, birth certificate 608, or alternatively a citizenship certificate or birth card (not shown). Only one of these may be provided as part of the 100-point validation benchmark. A contribution of 40 points may be accumulated by providing a healthcare card 612, or a suitable written reference, driver's license, public service employee identification card, or tertiary education identification card (not shown). Various other types of corroborating identity information are ascribed lower point values. Overall, the prospective subscriber must provide identity data having a corresponding total point value exceeding 100 points.

Once the validation benchmark 606 has been satisfied, there is provided a documentation audit step 614, which may consist, for example, of a random check of documentation provided by the prospective subscriber, as an additional degree of security against fraudulent applications and/or validation errors. Once the audit has been successfully completed, at decision step 618 the identity of the prospective subscriber will either be considered to have been validated, moving on to application identity check step 626, or an error in validation will be flagged at step 620. The application identity check 626 consists of the checking of the identity data 604 extracted from the proof of identity documentation, against the application data 520 provided by the prospective subscriber in the application forms. Decision step 628 controls the flow of the process depending upon the outcome of the application identity check, and if the application data 520 and identity data 604 do not match, a validation error is once again flagged at step 620.

In the event of a failure of identity validation or application identity checking, at step 622 the data set is flagged, and all information is provisionally stored within a separate store 624 from the main account database. This enables the information associated with the rejected application to be retained for later review. For example, this information may be useful if it is subsequently decided that some action is necessary in relation to a suspected fraudulent activity, or simply if there has been an unintentional error in some part of the application and/or proof of identity data entry, so that the need to re-enter all data may be avoided in subsequent reprocessing of the applications.

If the check at decision step 628 is successful, then at subsequent step 630 the identity data is committed to a store 632, associated with the provisional account.

Figure 7:
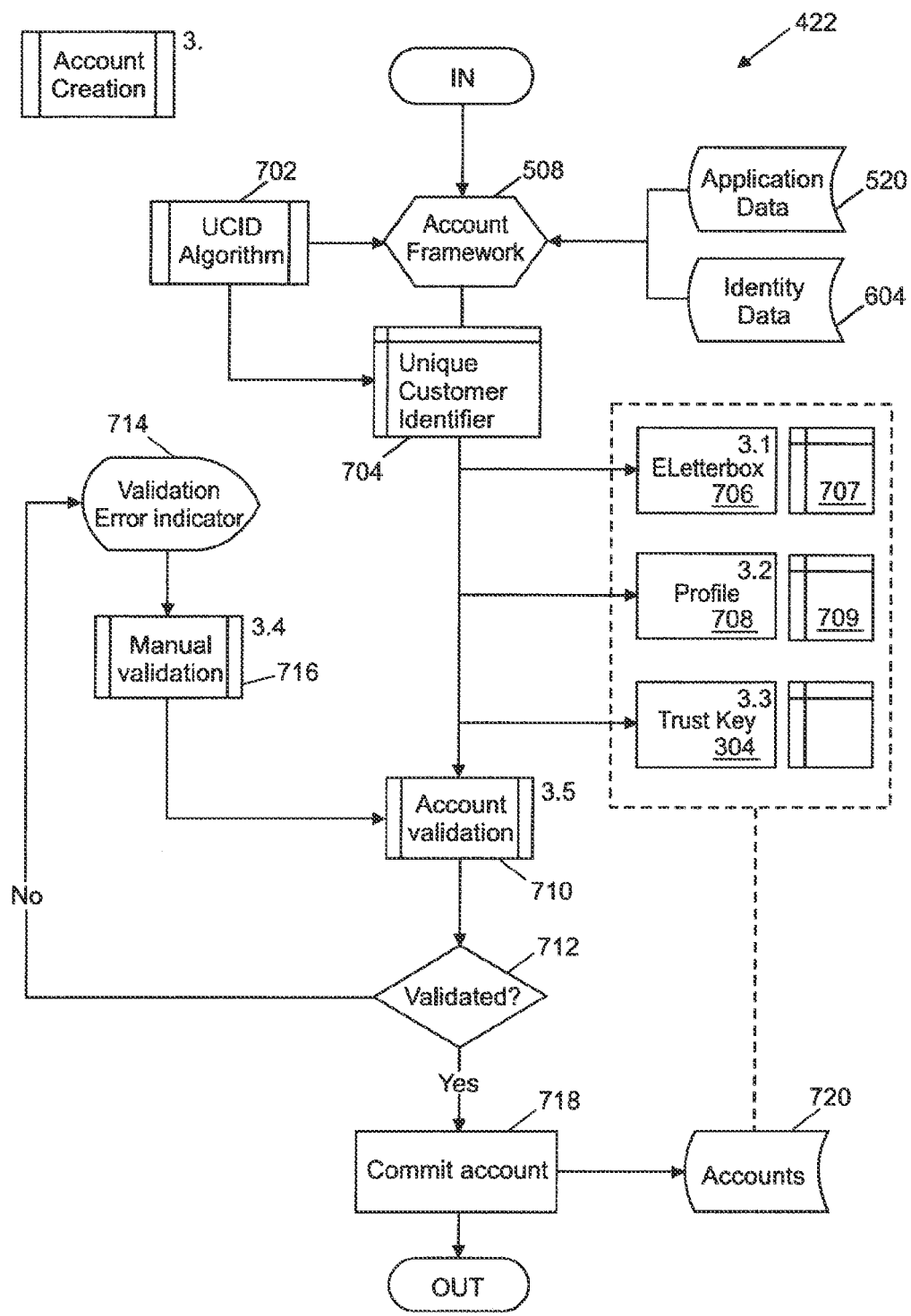
FIG. 7 is a flowchart of account creation according to an embodiment of the invention.

FIG. 7 is a flowchart illustrating account creation 422 according to a preferred embodiment of the invention. As will be appreciated from the foregoing description, the inputs to the account creation process 422 are the provisional account details 520, and the validated proof of identity data 604. At step 508 these are incorporated into the account framework, along with a unique customer identifier (UCID) 704, which is generated using an appropriate algorithm 702. It will be understood that a variety of different algorithms may be employed to generate and allocate a unique identifier to each subscriber. For example, a unique random number may be generated and allocated to each new subscriber. Alternatively, encoding and/or cryptographic techniques may be used to generate a unique subscriber identifier based upon various subscriber details held in the application data 520 and/or the identity data 604. Still a further alternative is to construct a unique identifier from a combination, or concatenation, of subscriber details.

Following generation of the UCID, further reference identifiers are generated corresponding with various additional data structures associated with the subscriber within the database 114. These include an E-letterbox reference 706 associated with E-letterbox data 707 of the subscriber, a profile reference 708, associated with profile data 709 of the subscriber, and the trust key 304 which authorises service provider access to the subscriber's E-letterbox, as described above in relation to FIGS. 1 to 3.

Once the application data 520, identity data 604, UCID 702, as well as the E-letterbox 706, profile 708 and trust key 304, have all been created and incorporated into the account framework, account validation step 710 is executed. The purpose of account validation 710 is to ensure the integrity and consistency of the user account data to be stored within the accounts database. In the event of an account validation failure, the decision step 712 directs control to step 714, in which a validation error is flagged. At subsequent step 716 a manual validation is conducted, in an attempt to establish the cause of the validation error, and to correct the problem, before returning control to the account validation step 710.

Once validation is successful, at step 718 the completed account data 720 is committed to the accounts database. The account is then ready for use by the subscriber.

As noted above, there is associated with the subscriber account an E-letterbox 706, a profile 708, and a trust key 304. The E-letterbox 706 has associated data 707, which includes essential mail items prepared for delivery to the subscriber. These may subsequently be collected by the subscriber, for example via a web-based interface, or via email, as previously described.

Essential mail items are delivered to the E-letterbox 706 by nominated service providers of the subscriber. Following creation of the subscriber account, subscriber nominations may be submitted, for example once again via a web-based interface, and corresponding nominated service provider details are associated with the subscriber account, for example within subscriber profile 708, and the trust key 304 is then provided, along with relevant further subscriber details, to the nominated service provider. Using the trust key, the nominated service provider is subsequently able to transfer essential mail data to the delivery server 102, for delivery to the subscriber's E-letterbox 706. The subscriber may at any time rescind nomination of a service provider, to prevent further delivery of essential mail items originating with that service provider. Additionally, it is possible to change the trust key 304, to deny all service providers holding the outdated trust key from further access to the subscriber E-letterbox 706. The updated trust key 304 may subsequently be forwarded only to those service providers whose nominations are confirmed by the subscriber. As will be appreciated, the use of the trust key 304, along with associated subscriber nominations, therefore provides multiple levels of security upon the subscriber's E-letterbox 706. Preferably the E-letterbox reference 706, the profile reference 708, and the trust key itself 304, as well as associated subscriber information, are suitably protected, for example using 128 bit minimum encryption.

The subscriber profile reference 708 is associated with additional subscriber profile data 709. Various information regarding the subscriber, and their preferences, may be held within the profile information 709 associated with the subscriber profile 708. For example, profile information 709 may include service provider nominations, subscriber delivery preferences, and preferences associated with the E-letterbox 706, such as storage and archiving preferences associated with essential mail items. That is, in preferred embodiments the subscriber is provided with control over desired behaviour of the E-letterbox 706. For example, a subscriber may wish to have all essential mail items retained within the E-letterbox 706 before and after collection, be retained within the E-letterbox for a fixed period, and/or subsequently deleted or transferred to archival storage. All such operations, and such variations, additions and alternatives as will be apparent to persons skilled in the art, fall within the general scope of the invention.

As will be appreciated from the foregoing, additional functionality and benefits may be achieved via preferred embodiments of the invention. The provision of a secure E-letterbox, over which the subscriber is able to exercise a high level of control, including access control, may enable a range of additional services and benefits. For example, the subscriber may use the E-letterbox as a storage centre for financial statements, bills, receipts, as well as other valuable personal and lifestyle correspondence and information. Management functions may support the subscriber in maintaining, organising and archiving such documents and information. The contents of the E-letterbox, and archives thereof, may relate to personal and financial information, such as health, employment, income, expenditure, payments, receipts, and so forth, much of which may be required by the subscriber for various reporting purposes. It may therefore become possible, by providing appropriate linkages with relevant authorities and service providers, for the subscriber to directly utilise information held within the E-letterbox, and associated storage and/or archives, in order to simplify or expedite various common tasks. For example, the subscriber may eventually be able to satisfy at least a substantial proportion of the requirements associated with completing tax returns, loan applications, passport applications, applications for government benefits, and so forth, in an automated manner using details extracted from documents and information stored in the E-letterbox. Ultimately, the complete automation of some such tasks is conceivable.

FIGS. 8A, 8B, 8C and 8D are flowcharts illustrating a number of exemplary alternative methods by which a trusted communications channel may be established between the delivery server 102 and a service provider, e.g. 310, and whereby the delivery server 102 may subsequently receive essential mail data from the service provider 310.

Figures 8A, 8B, 8C, 8D:
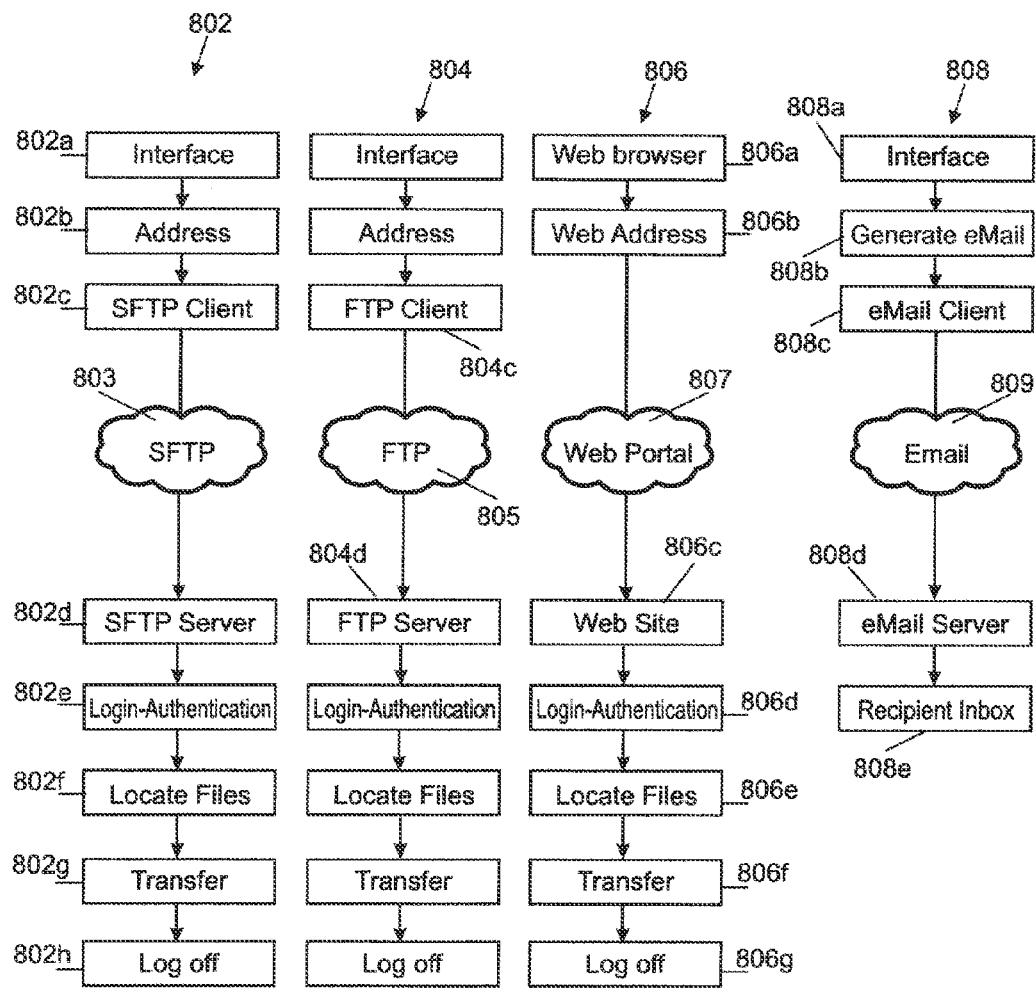
FIGS. 8A to 8D are flowcharts illustrating methods of establishing communications channels and transferring essential mail data according to preferred embodiments of the invention.

FIG. 8A illustrates a process 802 which provides a relatively high level of security, and which is based on the use of an SSH File Transfer Protocol (SFTP) 803. A suitable interface 802a, such as a graphical interface, command line interface, or scripting interface, is provided which enables a corresponding address 802b of a service provider computer system (e.g. an Internet address) to be passed to an SFTP client application program 802c. The SFTP protocol 803 establishes a connection to an SFTP server application 802d hosted on the service provider computer system. A login authentication process 802e provides the delivery server 102 with access to the service provider computer system, following which the essential mail data files may be located 802f, and the essential mail data to be transferred 802g. Thereafter, the connection is terminated by logging off 802h.

FIG. 8B illustrates an alternative process 804, based upon the standard File Transfer Protocol (FTP) 805. The overall connection and transfer process is identical to the SFTP process 802, except that the FTP 805 connection and transfer is facilitated by an FTP client application 804c on the delivery server side, and an FTP server application 804d on the service provider computer system side. As will be appreciated, the FTP-based process 804 provides a similar level of trust in the connection established between the delivery server 102 and the service provide computer system, since the delivery server 102 again initiates the connection using a known and trusted address 802b of the service provider computer system. However, whereas the SFTP protocol 803 provides encryption of transmitted data, the basic FTP protocol 805 does not. Accordingly, the SFTP method 802 is preferred, as providing a higher level of data security during transfer.

FIG. 8C illustrates a third transfer method 806, based upon a service provider web portal 807. In the method 806, a web site (HTTP server) 806c is provided by the service provider computer system. The resulting web interface may be accessed using a web browser 806a, or more generally any application including a suitable implementation of the HTTP protocol, and the web site 806c is identified by its corresponding web address 806b. As in the processes 802, 804, there may generally be provided a login/authentication step 806d, a file location step 806e, and a file transfer, or download, step 806f, all of which will operate in accordance with the particular coding of the service provider web site 806c. Finally, the connection may be terminated by logging off 806g.

FIG. 8D illustrates a further method for transferring essential mail data 808, which is based upon an email protocol 809 (such as SMTP). The process 808 differs from the processes 802, 804, 806 in that it is initiated by the service provider computer system. According to the method 808, an interface 808a, such as a manual or automated email application interface, is used to generate an email 808b which is addressed to an email address associated with the delivery server 102. An email client application 808c is utilised to send the resulting email, which may include essential mail data as an attachment, for example, via a standard email protocol 809. This is received by an email server 808d, and transferred to a recipient in-box 808e, from which it may be collected by, or on behalf of, the delivery server 102. Since email does not generally provide a trusted channel of communication, because originating email addresses are readily altered or tampered with, it is preferred that a trusted email-based channel be established utilising an additional security layer. For example, the essential mail data may be digitally signed utilising a private cryptographic key of the service provider, for which the corresponding public key has previously been forwarded to the delivery server 102 via a trusted and/or authenticated channel.

It will be appreciated that any of the transfer methods 802, 804, 806, 808 may be operated either in a fully automated manner, for example via suitable scripting, or may involve manual intervention. Transfer of essential mail data from various service providers, e.g. 310, 320, 330 may be performed on a scheduled basis, or upon demand, for example by enabling the service providers to flag the availability of new essential mail data awaiting transfer. Furthermore, while the methods 802, 804, 806 are all based upon initiation of a trusted communications channel by the delivery server 102, it will be appreciated that transfer of essential mail data on-demand by service providers may be achieved by allowing the service provider computer systems to initiate the connections. In this case, it is necessary, in order to establish a trusted communications channel, for the delivery server 102, or the firewall 107, to verify the identity of the computer system requesting the connection. As with the email process 808, such verification may be achieved utilising suitable cryptographic techniques, and alternatively, or additionally, via a login/password authentication method, or the like.

Additionally, various other protocols and methods for the transfer of essential mail data over a trusted communications channel between the service providers 310, 320, 330 and the delivery server 102 may be utilised. These include the use of private lines, such as telephone lines, or various other forms of private connection, or virtual private connection, and a wide variety of suitable communications methods will be apparent to persons skilled in the relevant art, and should be understood as all falling within the scope of the present invention.

The invention is therefore not to be considered as in any way limited by the foregoing description of preferred embodiments, which are provided by way of example only, but rather the scope of the invention is defined by the claims appended hereto.

I claim:

1. A method of providing a trusted electronic mail service comprising the steps of:
    providing a trusted electronic mail delivery server having an associated database for storage of subscriber details;
    receiving a registration application from a prospective subscriber, the registration application including predetermined minimum subscriber information and being associated with corresponding proof-of-identity data and/or documentation;
    said subscriber information comprising subscriber details selected from the group consisting of: subscriber's name; subscriber's address; subscriber's contact information; and combinations of the preceding subscriber information;
    said proof-of-identity data and/or documentation comprising details suitable for validation of the subscriber's identity selected from the group consisting of: subscriber's passport details; subscriber's tax file number; subscriber's social security number; subscriber's date of birth; subscriber's information suitable for validating or authenticating identity of subscriber; documents concerning subscriber suitable for validating or authenticating identity of subscriber; and combinations of the preceding proof-of identity data and/or documentation;
    authenticating the identity of the prospective subscriber using the proof-of-identity data and/or documentation;
    creating for the authenticated subscriber a unique subscriber account, and storing corresponding subscriber details in the database;
    the trusted electronic mail delivery server subsequently receiving from the subscriber a nomination of at least one service provider which the subscriber considers to be a source of essential mail items, and storing said nomination in the database in association with the subscriber details;
    establishing a trusted communications channel between the trusted electronic mail delivery server and a service provider computer system;
    the trusted electronic mail delivery server receiving mail data from the service provider computer system via said communications channel;
    the trusted electronic mail delivery server verifying that the subscriber wishes to receive a mail item corresponding with the mail data in electronic form, by comparison with subscriber details and nominations stored in the database;
    in the event that said verification is successful, the trusted electronic mail delivery server storing the mail item in a secure electronic mailbox associated with the subscriber account; and
    the trusted electronic mail delivery server subsequently delivering the stored mail item to the subscriber in electronic form in accordance with subscriber preferences associated with the subscriber account.

2. The method of claim 1 wherein the step of creating for the authenticated subscriber a unique subscriber account comprises allocating to the subscriber a unique subscriber identifier.

3. The method of claim 1 wherein the step of establishing a trusted communications channel comprises the trusted electronic mail delivery server initiating a connection with the service provider computer system.

4. The method of claim 1 wherein the step of establishing a trusted communications channel comprises:
    the service provider computer system initiating a connection with the trusted electronic mail delivery server; and
    the trusted electronic mail delivery server authenticating the service provider computer system,
    whereby the trusted communications channel is established only if authentication of the service provider computer system is successful.

5. The method of claim 1 wherein the trusted communications channel is a secure channel comprising at least an encrypted channel or a private line.

6. The method of claim 1 wherein the mail data received by the trusted electronic mail delivery server via the trusted communications channel is a formatted copy of the mail item itself, in a form suitable for delivery to the subscriber.

7. The method of claim 1 wherein the mail data is data specifying content of the mail item, and requiring further formatting prior to delivery to the subscriber.

8. The method of claim 1 wherein the step of the trusted electronic mail delivery server verifying that the subscriber wishes to receive the mail item comprises checking the subscriber nominations in the database to confirm that the subscriber indeed wishes to receive mail items from the service provider.

9. The method of claim 8 further comprising comparing customer details provided by the service provider with the corresponding customer details held in the database.

10. The method of claim 1 wherein the step of delivering comprises providing the mail item to the subscriber for download via a web-based interface.

11. The method of claim 1 wherein the step of delivering comprises forwarding the mail item to the subscriber via email.

12. A method of providing a trusted electronic mail service to a plurality of subscribers comprising the steps of:
providing a trusted electronic mail delivery server having an associated database for storage of subscriber details;
receiving a plurality of registration applications from a corresponding plurality of prospective subscribers, each registration application including predetermined minimum subscriber information and being associated with corresponding proof-of-identity data and/or documentation of the corresponding prospective subscriber;
said subscriber information comprising subscriber details selected from the group consisting of: subscriber's name; subscriber's address; subscriber's contact information; and combinations of the preceding subscriber information;
said proof-of-identity data and/or documentation comprising details suitable for validation of each subscriber's identity selected from the group consisting of:
subscriber's passport details; subscriber's tax file number; subscriber's social security number; subscriber's date of birth; subscriber's information suitable for validating or authenticating identity of subscriber; documents concerning subscriber suitable for validating or authenticating identity of subscriber; and combinations of the preceding proof-of identity data and/or documentation;
authenticating the identity of each prospective subscriber using the proof-of-identity data and/or documentation;
creating for each authenticated subscriber a unique subscriber account, and storing corresponding subscriber details in the database;
the delivery server subsequently receiving from each of the plurality of subscribers a nomination of at least one service provider which each subscriber considers to be a source of essential mail items, and storing said nominations in the database in association with the corresponding subscriber details;
the trusted electronic mail delivery server establishing a plurality of trusted communications channels with a corresponding plurality of service provider computer systems;
the trusted electronic mail delivery server receiving from each of said service provider computer systems mail data from each service provider via the corresponding communications channel;
for each item of mail data, the trusted electronic mail delivery server verifying that a corresponding recipient subscriber wishes to receive a corresponding mail item in electronic form, by comparison with subscriber details and nominations stored in the database;
in the event that each said verification is successful, the trusted electronic mail delivery server storing each successfully verified mail item in a secure electronic mailbox associated with the corresponding recipient subscriber account; and
the trusted electronic mail delivery server subsequently delivering each stored mail item to the corresponding subscriber in electronic form in accordance with subscriber preferences associated with the subscriber account.

13. A trusted electronic mail delivery server comprising:
at least one processor;
a database containing subscriber details including at least one nominated service provider from which the subscriber wishes to receive mail items in electronic form, wherein the subscriber details are obtained by:
receiving a registration application from the subscriber, the registration application including predetermined minimum subscriber information and being associated with corresponding proof-of-identity data and/or documentation;
said subscriber information comprising subscriber details selected from the group consisting of: subscriber's name; subscriber's address; subscriber's contact information; and combinations of the preceding subscriber information,
said proof-of-identity data and/or documentation comprising details suitable for validation of the subscriber's identity selected from the group consisting of: subscriber's passport details; subscriber's tax file number; subscriber's social security number; subscriber's date of birth; subscriber's information suitable for validating or authenticating identity of subscriber; documents concerning subscriber suitable for validating or authenticating identity of subscriber; and combinations of the preceding proof-of identity data and/or documentation;
authenticating the identity of the subscriber using the proof-of-identity data and/or documentation;
creating for the authenticated subscriber a unique subscriber account, and storing corresponding subscriber details in the database;
receiving from the subscriber a nomination of at least one service provider which the subscriber considers to be a source of essential mail items, and storing said nomination in the database in association with the subscriber details; and
subsequently receiving from the subscriber a nomination of at least one service provider which the subscriber considers to be a source of essential mail items,
at least one data communications interface operatively coupled to the processor; and
at least one storage medium operatively coupled to the processor, the storage medium containing program instructions for execution by the processor, said program instructions causing the processor to execute the steps of:
establishing via the data communications interface a trusted communications channel with a service provider computer system;
receiving mail data from the service provider computer system via said communications channel;
verifying that the subscriber wishes to receive a mail item corresponding with the mail data in electronic form, by comparison with subscriber details and nominations stored in the database;
in the event that verification is successful, storing the mail item in a secure electronic mailbox associated with the subscriber account; and
subsequently delivering the mail item to the subscriber in electronic form in accordance with subscriber preferences associated with the subscriber account.

14. The delivery server of claim 13, wherein the storage medium contains further program instructions for execution by the processor, said further program instructions causing the processor to execute a method for generating a unique subscriber identifier associated with the subscriber.

15. The delivery server of claim 13 wherein the storage medium further contains program instructions for execution by the processor, and causing the processor to execute the step of establishing a trusted communications channel by initiating an outgoing connection with the service provider.

16. The delivery server of claim 13 wherein the storage medium further contains program instructions for execution by the processor, and causing the processor to execute the step of establishing a trusted communications channel by accepting and authenticating an incoming connection request from the service provider computer system.

17. The delivery server of claim 13 wherein the storage medium further contains program instructions for execution by the processor, and causing the processor to execute the step of formatting a mail item based upon the mail data received from the service provider.

18. The method of claim 1 comprising the further step of the trusted electronic mail delivery server, after receiving from the subscriber a nomination of at least one service provider, providing the service provider with an authorisation identifier corresponding with the subscriber account, and wherein establishing the trusted communications channel between the trusted electronic mail delivery server and a service provider computer system comprises the trusted electronic mail delivery server receiving and verifying a copy of the authorisation identifier from the service provider computer system.

19. The method of claim 12 comprising the further step of the trusted electronic mail delivery server, after receiving from any one of the plurality of subscribers a nomination of at least one service provider, providing the service provider with an authorisation identifier corresponding with the subscriber account, and wherein establishing any one of the trusted communications channels between the trusted electronic mail delivery server and a service provider computer system comprises the trusted electronic mail delivery server receiving and verifying a copy of the authorisation identifier from the service provider computer system.

20. The delivery server of claim 13 wherein the at least one service provider is provided with an authorisation identifier corresponding with the subscriber account, and wherein the program instructions cause the processor to execute establishing a trusted communications channel with the service provider computer system by a method which comprises receiving, via the data communications interface, and verifying a copy of the authorisation identifier from the service provider computer system.

\* \* \* \* \*